(12) United States Patent
Hanebutte (10) Patent No.: US 9,261,602 B2
(45) Date of Patent: Feb. 16, 2016

(54) LOCATION CHANGE DETECTION BASED ON AMBIENT SENSOR DATA

(71) Applicant: INTEL CORPORATION, Santa Clara, CA (US)

(72) Inventor: Ulf R. Hanebutte, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 542 days.

(21) Appl. No.: 13/719,860

(22) Filed: Dec. 19, 2012

(65) Prior Publication Data

US 2014/0172365 A1   Jun. 19, 2014

(51) Int. Cl.
*G06F 17/18* (2006.01)
*G01S 19/48* (2010.01)

(52) U.S. Cl.
CPC ........................................ *G01S 19/48* (2013.01)

(58) Field of Classification Search
CPC .................................. G01S 19/48; G01D 1/16
USPC ......... 702/3, 36, 127, 141, 150, 181; 455/418; 340/870.02
See application file for complete search history.

(56) References Cited

U.S. PATENT DOCUMENTS

2012/0310587 A1\* 12/2012 Tu et al. ......................... 702/141

\* cited by examiner

*Primary Examiner* — John H Le
(74) *Attorney, Agent, or Firm* — International IP Law Group, P.L.L.C.

(57) ABSTRACT

A method for determining a location change based on contextual data is disclosed. The method may include gathering contextual data from ambient sensors of a device. The method may include determining a probability value that the device has changed location. The method may include comparing the probability value with a predetermined value. The method may include determining whether the location has changed based on the comparison of the probability value with the predetermined value.

21 Claims, 6 Drawing Sheets

FIG. 6

LOCATION CHANGE DETECTION BASED ON AMBIENT SENSOR DATA

TECHNICAL FIELD

This disclosure relates generally to methods and systems of receiving contextual data. More specifically, the techniques disclosed relate to receiving contextual data from ambient sensors to determine a change in location.

BACKGROUND ART

A computing device may be configured to perform operations based on a location change. For example, the computing device may be configured to scan for available wireless networks when the location of the computing device has changed. As computing devices become more complex, they may include more sensors to gather data. Sensors may provide contextual data to a computing device. The contextual data may enable advanced operations to be performed at the computing device based on the contextual data. Contextual data may include gathering data from a location sensor such as a global positioning (GPS) sensor configured to provide location data to the computing device. Gathering GPS data may include engaging a central processor of a computing device to perform operations to gather the location data via the GPS sensor.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The present disclosure relates generally to techniques for determining whether a computing device has changed location based on ambient sensor data. The computing device may be configured to gather data from a plurality of ambient sensors. For example, the computing device may gather data from an ambient light sensor, an ambient temperature sensor, and a humidity sensor. If the device has changed location, the data gathered in each one of the ambient sensors may also change. The computing device may be configured to determine that the location has changed based on the gathered ambient sensor data. In some embodiments, the determination may be based on a probability value indicating the probability that the location has changed. The probability value may include the number and type of ambient sensors providing data to the computing device.

Figure 1:
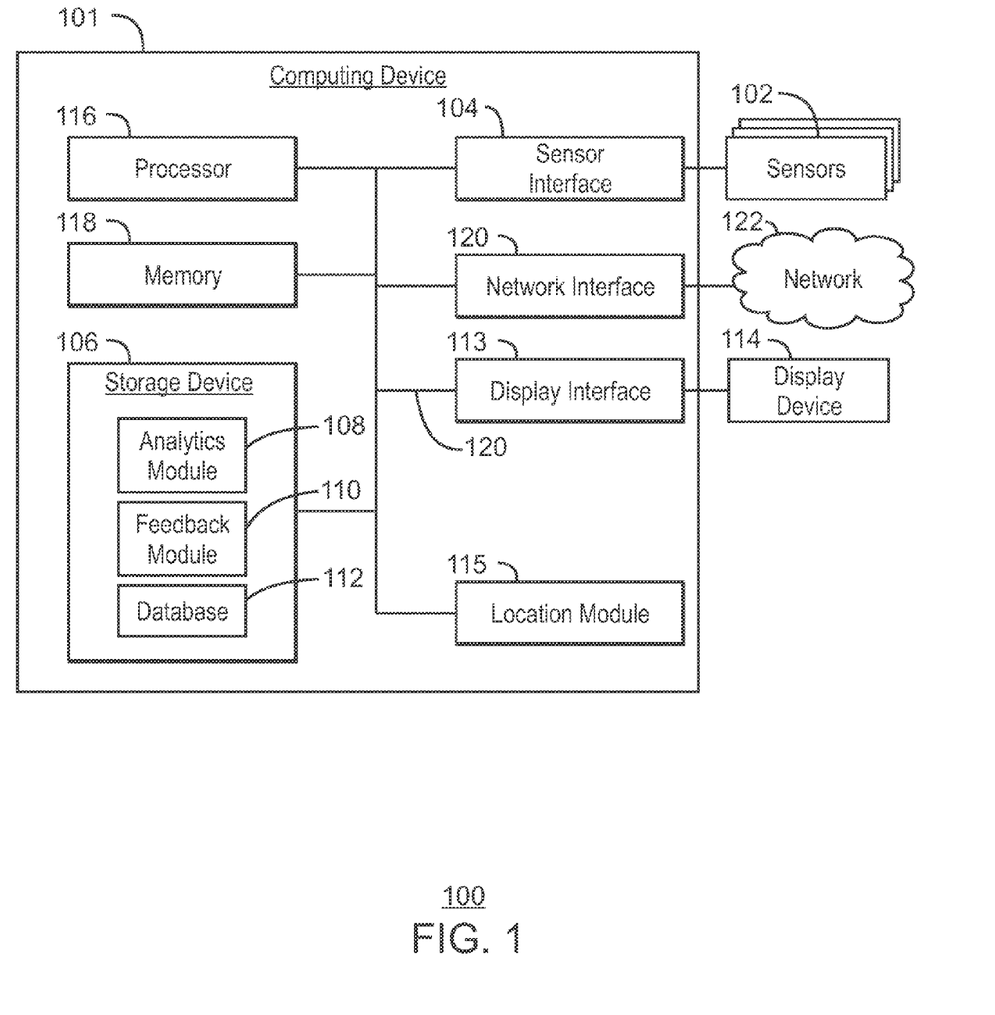
FIG. 1 is a block diagram illustrating a system including a computing device communicatively coupled to a plurality of ambient sensors, in accordance with embodiments.

FIG. 1 is a block diagram illustrating a system 100 including a computing device 101 communicatively coupled to ambient sensors 102, in accordance with embodiments. The computing device 101 includes a sensor interface 104. The sensor interface 104 may be configured to gather contextual data from the sensors 102. The computing device 101 may also include a processor 116 and a storage device 106.

The computing device 101 may be, for example, a laptop computer, desktop computer, tablet computer, mobile device, server, or cellular phone, a wearable computing device, among others. The processor 116 can be a single core processor, a multi-core processor, a computing cluster, or any number of other configurations. The processor 116 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the main processor 116 includes dual-core processor(s), dual-core mobile processor(s), or the like.

The computing device 101 may include a memory device 118. The memory device 118 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems.

The processor 116 may be connected through a system bus 120 (e.g., PCI, ISA, PCI-Express, HyperTransport®, NuBus, etc.) to the sensor interface 104. The processor 116 may also be linked through the system bus 120 to a display interface 113 adapted to connect the computing device 101 to a display device 114. The display device 114 may include a display screen that is a built-in component of the computing device 101. The display device 114 may also include a computer monitor, television, or projector, among others, that is externally connected to the computing device 101.

The storage device 106 may be a non-transitory computer-readable medium. The storage device 106 may have instructions stored thereon that when executed by the processor 116 cause the computing device 101 to perform operations. In some embodiments, the operations may be carried about by hardware logic. Hardware logic at least partially includes hardware, and may also include software, or firmware. Hardware logic may include electronic hardware including interconnected electronic components which perform analog or logic operations on received and locally stored information to produce as output or store resulting new information or to provide control for output actuator mechanisms. Electronic hardware may include individual chips/circuits and distributed information processing systems.

The storage device 106 may also include an analytics module 108. In some embodiments, the analytics module 108 is a collection of instructions stored on the storage device 106 to cause the computing device 101 to perform operations related to gathering contextual data and determining a location change of the computing device 101. In other embodiments, the analytics module 108 may be remote from the storage device. In this embodiment, the operations may be carried out by the analytics module 108 via logic at least partially including hardware logic. In some embodiments, the analytics module 108 may be located at the sensor interface 104. In other embodiments, the analytics module 108 may be remote from the computing device 101, and may be configured to receive contextual data from the sensors 102 and communicate with the computing device 101 from a remote connection such as a network 122, via a network interface 120. In some embodiments, the analytics module 108 may be a controller. In these embodiments, the controller may be a microcontroller configured to carry out the operations related to gathering contextual data and determining a location change of the computing device 101. In other embodiments, the analytics module 108 may be logic at least partially comprising hardware logic. Hardware logic at least partially includes hardware, and may also include software, or firmware. Hardware logic may include electronic hardware including interconnected electronic components which perform analog or logic operations on received and locally stored information to produce as output or store resulting new information or to provide control for output actuator mechanisms. Electronic hardware may include individual chips/circuits and distributed information processing systems. In any of these embodiments, the operations may include gathering contextual data from the ambient sensors. The operations performed by the analytics module 108 may also include determining a probability value that the computing device has changed location. The operations may also include comparing the probability value with a predetermined value. The operations may also include determining whether the location has changed based on the comparison of the probability value with the predetermined value.

In some embodiments, the storage device 106 may include a database 112. The database 112 may be configured to store historical probability values and predetermined values associated with the determination of a changed location. In some embodiments, the predetermined value is based on comparison data previously stored in the database 112. Accordingly, the predetermined value may be based on historical data. The database 112 may be configured to store data related to analytics performed by the analytics module 108 such as updates that may be received via the analytics performed. The database 122 may be configured to store data related to feedback received from a feedback mechanism discussed in more detail below.

In some embodiments, the storage device 106 may include a feedback module 110. The feedback module 110 may be configured to receive feedback related to the accuracy of the determination of location change. The accuracy may be determined by comparison of the location change determination with feedback. The feedback module 110 may receive feedback from various inputs. For example, the feedback module 110 may be configured to receive a feedback from a user of the computing device 101. In some embodiments, the computing device 101 may include a location module 115. The location module 115 may be any location determination device, such as a global positioning device (GPS), configured to determine the location of the computing device 101 by communication with external objects. In this embodiment, the feedback module 110 may be configured to receive feedback from a location module of the computing device 101, such as a GPS device configured to gather data related to the location of the computing device 101. For example, if the analytics module 108 determines that the location of the computing device 101 has changed, the GPS may compare the determination of location change with the GPS data, confirm or deny a location change, and provide the result to the feedback module 110. The feedback module 110 may be configured to store the results of the comparison in the database 112. Subsequent comparisons of the contextual data gathered from the ambient sensors with the predetermined value may be, in part, based on the input received from the feedback module 110.

In some embodiments, determining whether the location has changed is performed even when the computing device 101 is in a low power or sleep device state. For example, the computing device 101 may be configured to transition from a normal operating state to a device sleep state or a low power state. Either the low power or the device sleep state may include decreasing the operations of a main processor, such as the processor 116. The analytics module 108 may be configured to gather contextual data from the ambient sensors 102 without executing the processor 116. In some embodiments, the analytics module 108 may notify the processor 116 of the computing device 101 to exit from the low power or the sleep device state. By notifying the processor 116 to exit the low power or sleep device state, the computing device 101 may conserve power by enabling the main processor to reduce operations while continuing to gather location data at the ambient sensors 102 via the analytics module 108.

In some embodiments, the ambient sensors 102 may be different types of sensors relative to each other. For example, a first ambient sensor may be a temperature sensor, a second ambient sensor may be a humidity sensor, and a third ambient sensor may be an ambient light sensor. However, the sensors are not limited to the type of sensors or the configuration of sensors described herein. For example, the ambient sensor may include two or more of an ambient light sensor, a humidity sensor, a temperature sensor; a pressure sensor; a carbon dioxide sensor; and a volatile organic compound sensor. Further, the sensors may include any sensor presently described or developed in the future. The analytics module 108 may be configured to gather contextual data from the different types of ambient sensors 102. The analytics module 108 may also be configured to combine the contextual data from each of the different type of ambient sensors 102. The probability value that the computing device 101 has changed location may be based on the combine contextual data. In some embodiments, the combination of contextual data may be an average of individual probability values each associated with contextual data gathered from one type of the ambient sensors 102. By combining the contextual data gathered from different types of ambient sensors 102, determining whether the computing device 101 has changed location may be relatively more accurate than if contextual data was gathered by the analytics module 108 from only one type of ambient sensor 102.

Figure 2:
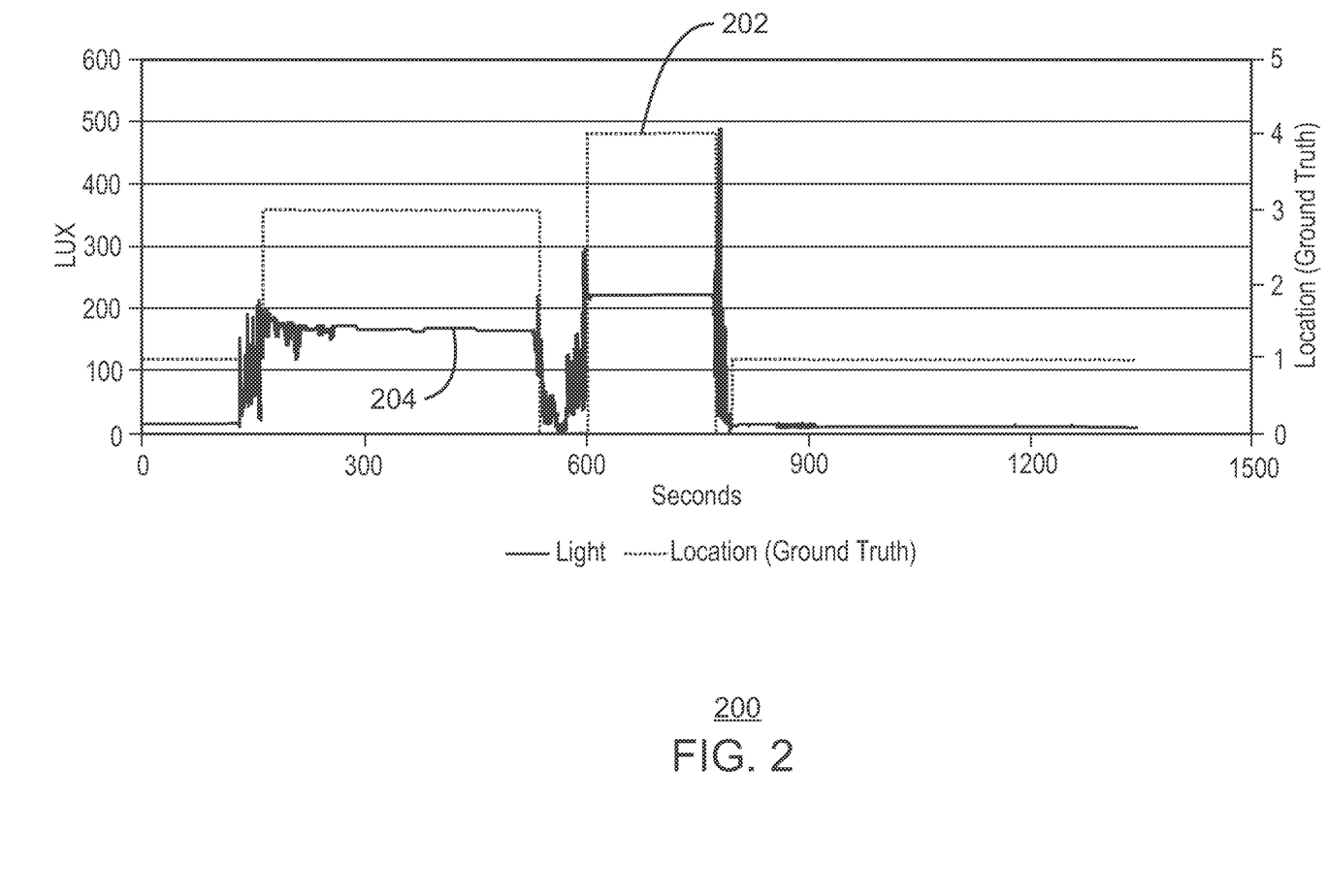
FIG. 2 is a graph illustrating contextual data gathered from an ambient light sensor, in accordance with embodiments.

FIG. 2 is a graph 200 illustrating contextual data gathered from an ambient light sensor, in accordance with embodiments. The location change is indicated by the dashed line 202. The contextual data indicating the ambient light is indicated by the line 204. As illustrated in FIG. 2, the ambient light levels (indicated by line 204) may change relative to a change in location (indicated by the dashed line 202). Other types of contextual data may be gathered.

Figure 3:
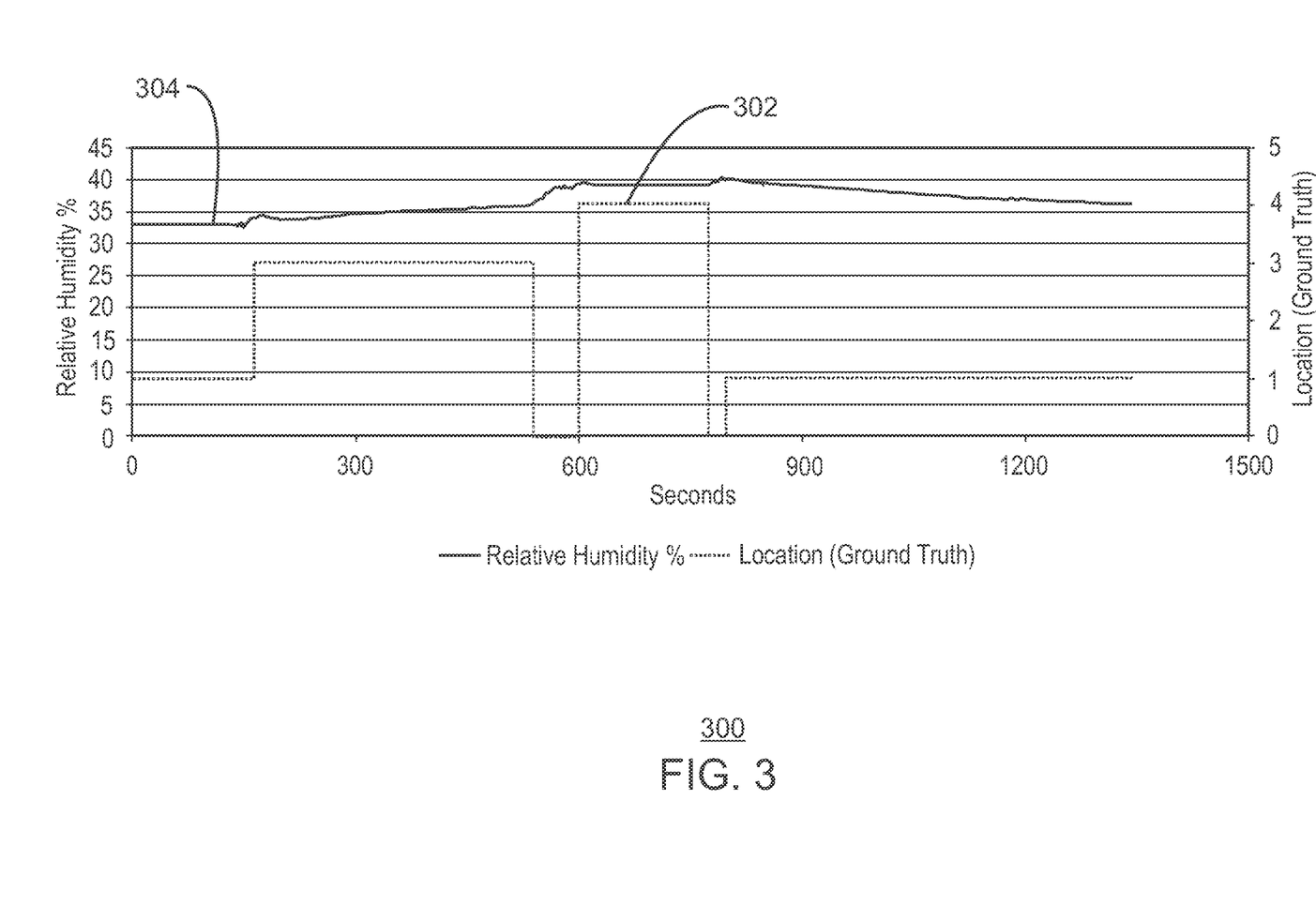
FIG. 3 is a graph illustrating contextual data gathered from an ambient humidity sensor, in accordance with embodiments.

FIG. 3 is a graph 300 illustrating contextual data gathered from an ambient humidity sensor, in accordance with embodiments. The location change is indicated by the dashed line 302. The contextual data indicating the ambient humidity is indicated by the line 304. As illustrated in FIG. 3, the ambient humidity levels (indicated by line 304) may change relative to a change in location (indicated by dashed line 302). In some embodiments, the contextual data gathered from one type of ambient sensor may reflect a less dramatic change in contextual data gathered. For example, the change in the line 304, when compared to the line 204 of FIG. 2, may be less dramatic due to the type of ambient sensor indicated in each graph. However, the change in the line 304 of FIG. 3, in conjunction with the change in the line 204, may provide a more accurate determination of a location change.

Figure 4:
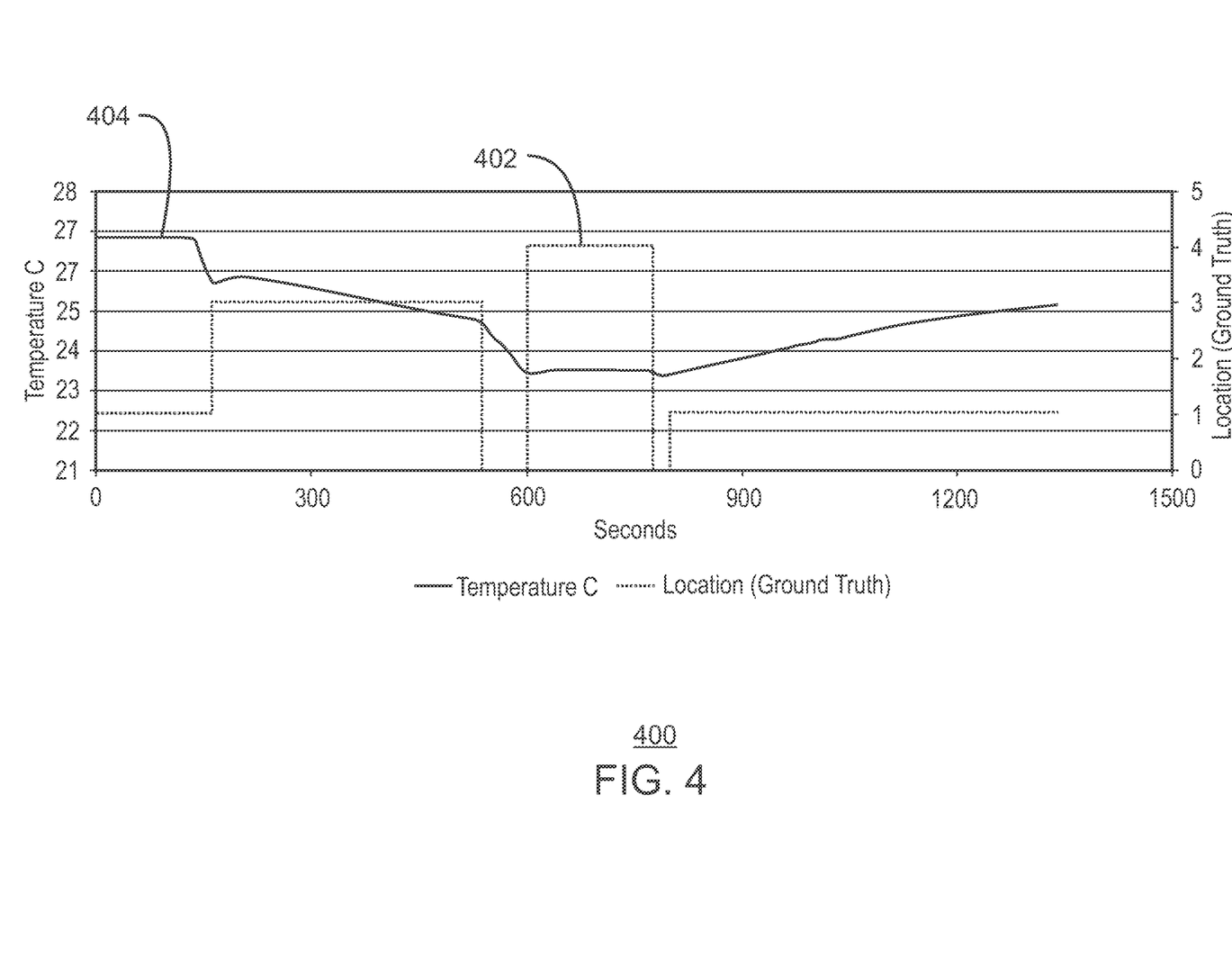
FIG. 4 is a graph illustrating contextual data gathered from an ambient temperature sensor, in accordance with embodiments.

FIG. 4 is a graph 400 illustrating contextual data gathered from an ambient temperature sensor, in accordance with embodiments. The location change is indicated by the dashed line 402. The contextual data indicating the ambient temperature is indicated by the line 404. As illustrated in FIG. 4, the ambient temperature levels may change relative to a change in location. As discussed above, when contextual data from different types of ambient sensors is gathered, the totality of the contextual data may indicate a change in location more accurately than a change in contextual data from only one type of sensor. For example, when considering the change in the line 404 of FIG. 4 alone, a probability value may be determined that the location has changed when the slope of the line 404 has changed. However, the accuracy of the a determination that the location has changed may be higher when the slope of the line 404 changes close to the same time of the change of the line 304 of FIG. 3, or the line 204 of FIG. 2.

Figure 5:
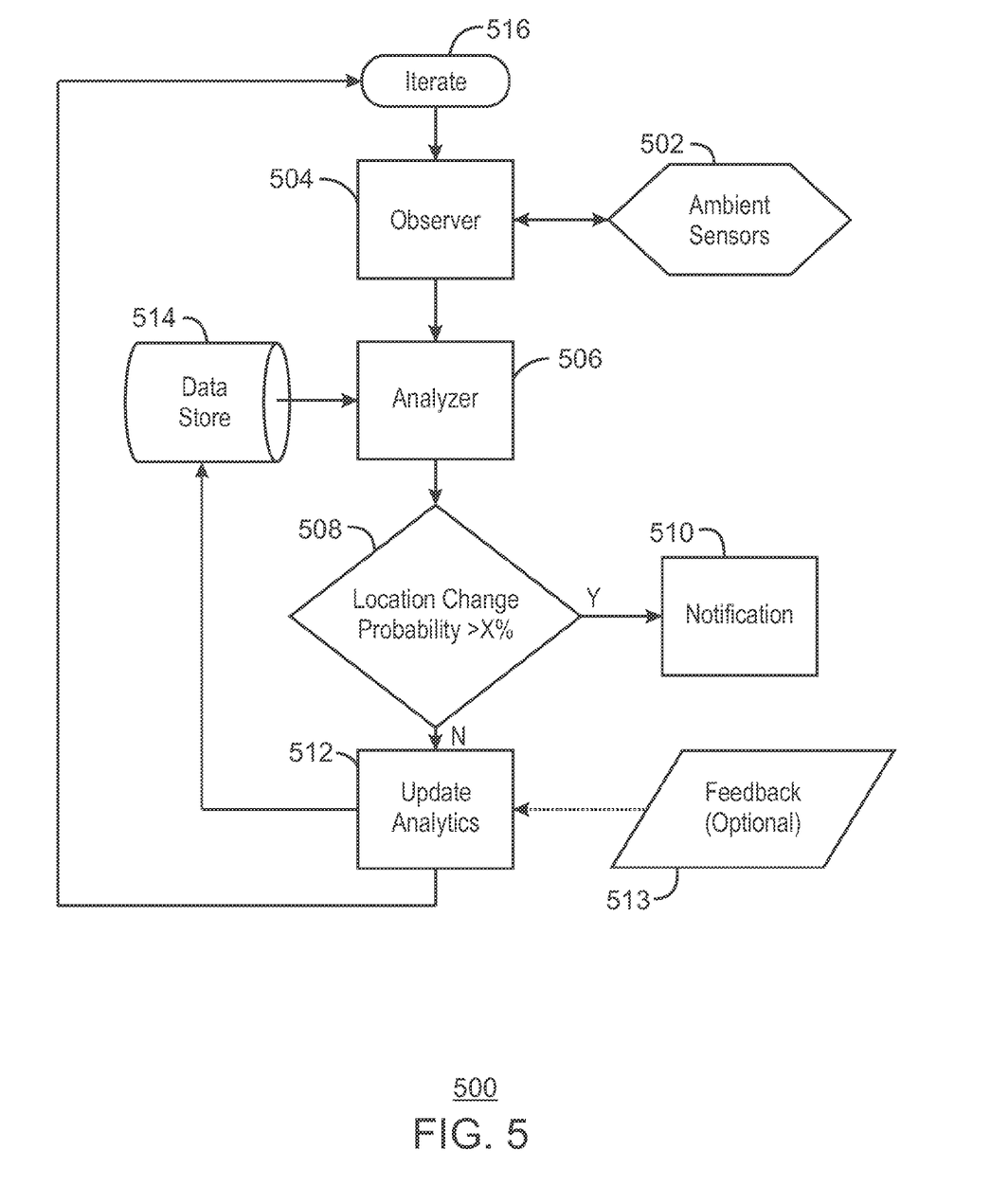
FIG. 5 is a process flow diagram to determine a location change of a computing device, in accordance with embodiments.

FIG. 5 is a process flow diagram 500 to determine a location change of a computing device, in accordance with embodiments. The ambient sensors at block 502 may gather contextual data. The ambient sensors at block 502 are sensors configured to gather information related to the ambient conditions, other than specific location, of the computing device. While the change in ambient conditions may indicate a change in location, the ambient conditions themselves are not directly related to location or position. The ambient sensors at block 502 may include two or more of an ambient light sensor, a humidity sensor, a temperature sensor; a pressure sensor; a carbon dioxide sensor; and a volatile organic compound sensor. The ambient sensors at block 502 may gather contextual data without operation of a main processor such as the main processor 116 of FIG. 1. The observer at block 504 may be a sensor interface, such as the sensor interface 104 of FIG. 1, configured to receive contextual data from the ambient sensors at block 502. The analyzer at block 506 may be an analytics module, such as the analytics module 108 of FIG. 1. The analyzer at block 506 may be configured to carry out operations. The operations may also include determining a probability value that the computing device has changed location. The operations may also include comparing, at block 508, the probability value with a predetermined value. The operations may also include determining, at block 508, whether the location has changed based on the comparison of the probability value with the predetermined value. If the probability value exceeds the predetermined value, a main processor, such as the processor 116 of FIG. 1, may be notified at block 510. If the probability value does not exceed the predetermined value, the analytics performed by the analyzer at block 506 may be updated at block 512. In some embodiments, the probability value may be compared with feedback, at block 513, provided from a peripheral source such as a user interaction or with a GPS device. The update may be stored at block 514. The process flow may begin again at block 516.

Figure 6:
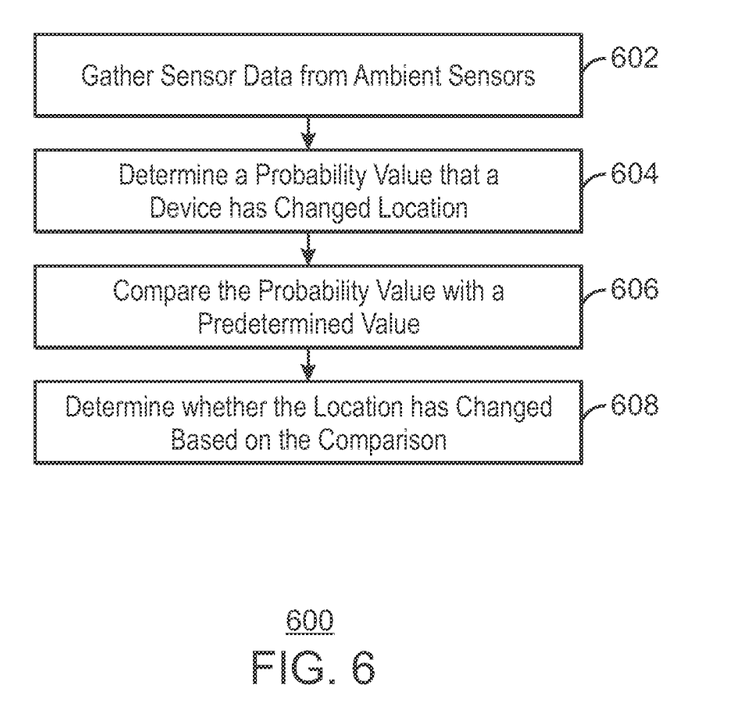
FIG. 6 is a block diagram illustrating a method of receiving contextual data and determining a location change, in accordance with embodiments.

FIG. 6 is a block diagram illustrating a method 600 of receiving contextual data and determining a location change, in accordance with embodiments. The method 600 may include gathering, at block 602, the sensor data from ambient sensors. The ambient sensors may be attached to a device. The method 600 may include determining, at block 604, a probability value that the device has changed location. The probability value is based on the contextual data gathered from the ambient sensors. As discussed above in reference to FIG. 5, the ambient sensors do not directly indicate the location of the device. However, the change in the contextual data may indicate a change of the location of the device. The method 600 may include comparing, at block 606, the probability value with a predetermined value. The method 600 may include, at block 608, determining whether the location has changed based on the comparison of the probability value with the predetermined value.

In some embodiments, the predetermined value may be stored in a database of the device. The predetermined value may also be based on comparison data previously stored in the database. For example, the when the method completes a comparison at block 606 and a determination at block 608, the comparison and the determination may be used to update the predetermined value for subsequent comparisons and determinations of location change.

In some embodiments, the method 600 may also include notifying a processor of the device that the location has changed when the location is determined to have changed. Determining whether the location has changed may be performed even when the device is in a low power or a sleep device state. In other words, contextual data may be gathered and a location change may be determined without the use of a main processor of the device. The method 600 may also include notifying the processor of the device to exit from the low power or sleep device state when the location has changed.

In some embodiments, the method 600 may also include receiving feedback related to the accuracy of the determination of location change. The feedback may be provided from one or more of a user of the method 600, and a location module of the device. As discussed above in reference to FIG. 1, the user of the device may provide feedback confirming the accuracy of the location change. In some embodiments, the method 600 may include rendering a message to the user asking for whether the device's location has changed. The feedback received may be used to update the predetermined value associated with a location change. In other embodiments, the location module is a GPS device configured to provide location information of the device. The method 600 may include confirming the accuracy of the predetermined value indicating a change in location, and updating the predetermined value based on the confirmation with the GPS device.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

EXAMPLE 1

A method is described herein. The method may include gathering the sensor data from ambient sensors. The method may include determining a probability value that the device has changed location. The probability value is based on the contextual data gathered from the ambient sensors. The method may include comparing the probability value with a predetermined value. The method may include determining whether the location has changed based on the comparison of the probability value with the predetermined value.

The ambient sensors may include any number of sensors, and any type of sensor related to ambient conditions, rather than directly related to geographic location changes, or geospatial location changes. The ambient sensors gather data that may be analyzed to indicate a change in location.

EXAMPLE 2

A computing device is described herein. The computing device may include an ambient sensor and an analytics module. The analytics module may be configured to receive contextual data from the ambient sensor. The analytics module may be configured to determine a probability value indicating whether the computing device has changed location. The analytics module may also be configured to compare the probability value with a predetermined value and determine whether the location has changed based on the comparison of the probability value with the predetermined value.

The analytics module may be a set of instructions stored on a storage device and executed by a microprocessor. The analytics module may be comprised of a logic circuit configured to compare probability values to a predetermined value to determine a change in location.

EXAMPLE 3

A system is disclosed herein. The system may include a computing device. The system may include ambient sensors to gather contextual data indicating ambient conditions of the system. The system may include a controller to receive the contextual data from the ambient sensors. The controller may be further configured to determine a probability value that the computing device has changed location, compare the probability value with a predetermined value, and determine whether the location has changed based on the comparison of the probability value with the predetermined value.

The controller may be set of instructions stored on a storage device executed by a microprocessor. The controller may be a logic circuit configured to compare probability values to a predetermined value to determine a change in location. The ambient sensors may be remote from the computing device and may be configured to broadcast data streams to the computing device or the system.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

In the preceding description and the following claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A non-transitory computer readable medium, comprising logic at least partially comprising hardware logic to:
   gather contextual data from an ambient sensor associated with a device;
   determine a probability value that the device has a changed location based on the contextual data;
   compare the probability value with a predetermined value; and
   determine whether the location has changed based on the comparison of the probability value with the predetermined value.

2. The non-transitory computer readable medium of claim 1, comprising logic to store the comparison in a database wherein the predetermined value is based on comparison data previously stored in the database.

3. The non-transitory computer readable medium of claim 1, comprising logic to notify a processor of the device that the location has changed when the location is determined to have changed.

4. The non-transitory computer readable medium of claim 1, comprising logic to receive feedback related to the accuracy of the determination of location change, the feedback provided from one or more of:
a user of the method; and
a location module of the device.

5. The non-transitory computer readable medium of claim 1, wherein determining whether the location has changed is performed when the device is in a low power state, a sleep device state, or any combination thereof.

6. The non-transitory computer readable medium of claim 5, comprising logic to notify a processor of the device to exit from the low power state, the sleep device state, or any combination thereof.

7. The non-transitory computer readable medium of claim 1, wherein the ambient sensors comprise:
an ambient light sensor;
a humidity sensor;
a temperature sensor;
a pressure sensor;
a carbon dioxide sensor; or
a volatile organic compound sensor.

8. A computing device, comprising a controller to:
receive contextual data from the ambient sensor,
determine a probability value indicating whether the computing device has changed location based on the contextual data;
compare the probability value with a predetermined value; and
determine whether the location has changed based on the comparison of the probability value with the predetermined value.

9. The computing device of claim 8, the operations comprising using a database of the storage device to store the comparison of the probability value with the predetermined value, wherein the predetermined value is based on comparison data previously stored in the database.

10. The computing device of claim 8, the operations comprising notifying a processor of the computing device that the location has changed when the location is determined to have changed based on the comparison of the probability value with the predetermined value.

11. The computing device of claim 8, the operations comprising receiving feedback related to the accuracy of the determination of location change, the feedback provided from one or more of:
a user of the method; and
a location module of the device.

12. The computing device of claim 8, wherein determining whether the location has changed is performed even when the device is in a low power or a sleep device state.

13. The computing device of claim 12, wherein the analyzer is to notify a processor of the device to exit from the low power or the sleep device state.

14. The computing device of claim 8, further comprising an ambient sensor, wherein the ambient sensor comprise:
an ambient light sensor;
a humidity sensor;
a temperature sensor;
a pressure sensor;
a carbon dioxide sensor; or
a volatile organic compound sensor.

15. A system, comprising:
a computing device;
ambient sensors to gather contextual data indicating ambient conditions of the system;
a controller to receive the contextual data from the ambient sensors, the controller further to:
determine a probability value that the computing device has changed location based on the contextual data;
compare the probability value with a predetermined value; and
determine whether the location has changed based on the comparison of the probability value with the predetermined value.

16. The system of claim 15, wherein the controller is to use a database of the storage device to store the comparison of the probability value with the predetermined value and wherein the predetermined value is based on comparison data previously stored in the database.

17. The system of claim 15, wherein the controller is to notify a processor of the computing device that the location has changed when the location is determined to have changed based on the comparison of the probability value with the predetermined value.

18. The system of claim 15, wherein the controller is to receive feedback related to the accuracy of the determination of location change, the feedback provided from one or more of:
a user of the method; and
a location module of the device.

19. The computing device of claim 15, wherein determining whether the location has changed is performed even when the device is in a low power or a sleep device state.

20. The computing device of claim 19, wherein the controller is to notify a processor of the device to exit the device from the low power or the sleep device state.

21. The computing device of claim 15, wherein the ambient sensors comprise:
an ambient light sensor;
a humidity sensor;
a temperature sensor;
a pressure sensor;
a carbon dioxide sensor; and
a volatile organic compound sensor.

* * * * *